United States Patent
Staszak

(10) Patent No.: US 7,172,206 B2
(45) Date of Patent: Feb. 6, 2007

(54) FOLDING BICYCLE TRAILER

(76) Inventor: Jeff Staszak, 1157 Rothie Rd., Deerfield, WI (US) 53531

( * ) Notice: Subject to any disclaimer, the term of this patent is extended or adjusted under 35 U.S.C. 154(b) by 141 days.

(21) Appl. No.: 11/038,992

(22) Filed: Jan. 20, 2005

(65) Prior Publication Data

US 2006/0108766 A1 May 25, 2006

Related U.S. Application Data

(60) Provisional application No. 60/630,741, filed on Nov. 22, 2004.

(51) Int. Cl.
*B62K 27/00* (2006.01)
(52) U.S. Cl. .............. 280/204; 280/656; 280/657
(58) Field of Classification Search ........... 280/642, 280/647, 656, 657, 658, 47.38, 204, 415.1
See application file for complete search history.

(56) References Cited

U.S. PATENT DOCUMENTS

| | | | | |
|---|---|---|---|---|
| 5,076,599 A * | 12/1991 | Lockett et al. | ........... | 280/204 |
| 5,267,744 A | 12/1993 | Berry et al. | | |
| 5,344,171 A | 9/1994 | Garforth-Bles | | |
| 5,454,577 A * | 10/1995 | Bell | ........... | 280/204 |
| 5,460,395 A | 10/1995 | Chen | | |
| 5,474,316 A * | 12/1995 | Britton | ........... | 280/204 |
| 5,599,033 A * | 2/1997 | Kolbus et al. | ........... | 280/204 |
| 5,829,770 A * | 11/1998 | Chiu | ........... | 280/204 |
| 5,921,571 A * | 7/1999 | Bell | ........... | 280/204 |
| 5,979,921 A * | 11/1999 | Derven et al. | ........... | 280/204 |
| 6,053,518 A * | 4/2000 | Chiu | ........... | 280/204 |
| 6,056,306 A * | 5/2000 | Rust et al. | ........... | 280/204 |
| 6,196,572 B1 * | 3/2001 | Durrin | ........... | 280/648 |
| 6,705,628 B2 * | 3/2004 | Kahmann | ........... | 280/204 |
| 6,896,275 B1 * | 5/2005 | Liu | ........... | 280/204 |
| 6,959,938 B1 * | 11/2005 | Liu | ........... | 280/204 |
| 2002/0074764 A1* | 6/2002 | Allen et al. | | |
| 2002/0096857 A1* | 7/2002 | Valdez et al. | | |

\* cited by examiner

*Primary Examiner*—Christopher Bottorff
(74) *Attorney, Agent, or Firm*—Barnes & Thornburg LLP; David C Brezina

(57) ABSTRACT

A folding carrier assembly converts to a bicycle trailer, a three-wheeled jogging stroller and a four wheeled casting stroller. The carrier assembly has a lower main frame. An arched rear or back frame member is pivotally connected to an aft portion of the lower main frame. The carrier assembly further has a single longitudinal arched member with a first end and a second end. A center support pivotally connects the arched member first end to a central fore area of the lower main frame. A user interface in the form of a release mechanism removably couples the arched member second end to a central area of the arched rear frame member. The carrier has two wheel assemblies on opposite lateral sides of the lower main frame. Wheel guards are disposed external and lateral to the wheel assembly. Supports on the fore portion of the lower main frame enable removable coupling to a jogging wheel assembly or a pair of caster wheels. Alternatively, a trailer tongue may be connected to one of the supports.

8 Claims, 15 Drawing Sheets

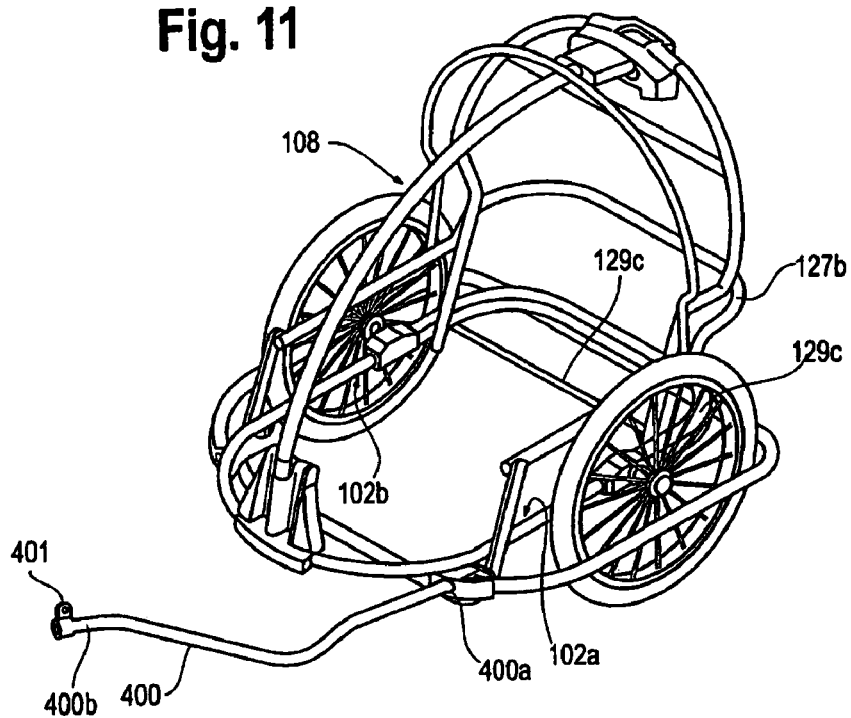
Fig. 11
Fig. 11A
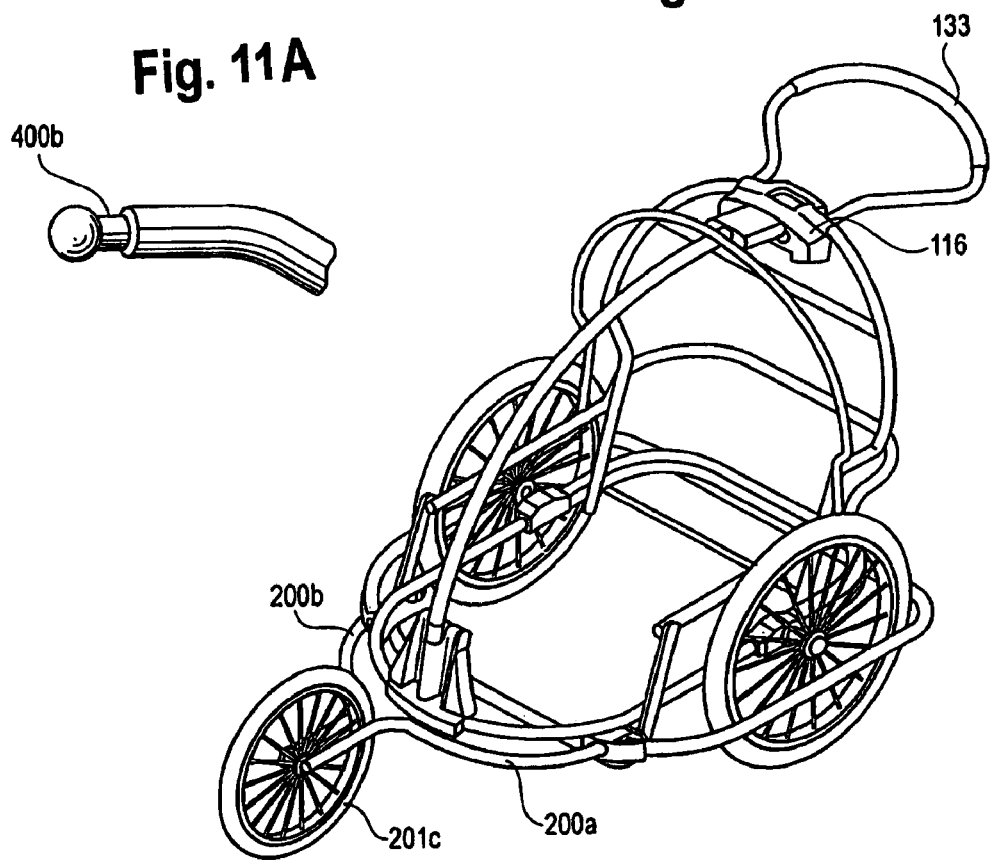
Fig. 12

FOLDING BICYCLE TRAILER

PRIORITY

This application claims priority from U.S. Provisional Application 60/630,741 filed Nov. 22, 2004.

FIELD OF INVENTION

A folding bicycle trailer convertible to a three-wheeled jogging stroller, or a four-wheeled caster stroller.

BACKGROUND OF INVENTION

Bicycle trailers have been used to transport children, camping gear, dogs and other items bicyclists desire to have with them during and after a bike ride. U.S. Pat. No. 5,829,770, Chiu, discloses a foldable bicycle trailer. The trailer can be seen in prior art FIGS. 1a and 1b. The trailer has a rectangular frame 20. The trailer has two wheels 21 provided on opposite sides of the frame. The trailer has a connecting device 23 which operates to connect the trailer to a towing bicycle. To support a sunshade 25 the trailer has a foldable sunshade support 28a, 28b, 28c. The support has curved rod 28a, upper rods 28b and lower rods 28c. A horizontal rod 29 can be depressed so as to release the lower rod from a bracing element and allow the lower rod to fold onto the carrier frame, the upper rod to fold onto the lower rod, and the curved rod to fold onto the upper rod.

U.S. Pat. No. 5,979,921, Derven discloses an alternative folding bicycle trailer. The trailer can be seen in prior art FIG. 2. The trailer 40 is connected to a bicycle via a trailer tongue 41 The trailer has a plastic molded monocoque shell 42. The trailer further includes a foldable canopy frame. The foldable canopy frame 44a, 44b includes a front canopy frame member 44a affixed to the front end of the body 42 via brackets 46. The canopy frame also includes a rear canopy frame member 44b which is attached to mount brackets 47 at the rear end of the body 42. The canopy frame members are pivotally secured to the brackets. Front canopy frame member 44a is removably coupled to the rear canopy frame member by a locking mechanism 48. To fold the canopy frame, the front canopy member 44a is disconnected from the rear canopy member 44b. The rear canopy member 44b is folded down into the monocoque body 42 and the front member 44a folds over the rear member with the canopy 49 folding therewith. The wheels of Derven collapse to fold underneath the monocoque frame.

U.S. Pat. No. 5,344,171, Gaforth-Bles, discloses a multipurpose sports vehicle for the carriage of children which can readily be converted between a three wheeled stroller which is pushed by a person jogging or running to a two wheeled trailer for convenient towing behind a bicycle or the like.

U.S. Pat. No. 5,454,577, Bell discloses a convertible trailer for towing behind a bicycle, the trailer being convertible between a trailer and a four wheeled stroller.

SUMMARY

The preferred embodiment of the invention is a bicycle trailer convertible to either a three-wheeled jogging stroller or a four-wheeled caster stroller. The main platform which converts between a bicycle trailer, a three-wheeled jogging stroller or a four-wheeled caster stroller is generically referred to herein as a carrier assembly.

A carrier assembly has a lower main frame. A curved rear or back frame member is pivotally connected to an aft portion of the lower main frame. The carrier assembly further has a single longitudinal curved member with a first end and a second end. A center support pivotally connects the curved member first end to a central fore area of the lower main frame. A release mechanism removably couples the curved member second end to a central area of the curved rear frame member. The carrier has two wheel assemblies on opposite lateral sides of the lower main frame. Wheel guards are disposed external and lateral to the wheels.

The carrier assembly when converted to a bicycle trailer has a trailer tongue coupled to a front portion of the carrier by means of a tubular receiver and a quick release pin.

The carrier assembly when converted to a three wheeled jogging stroller has a jogging wheel assembly. The jogging wheel assembly includes a pair of oppositely oriented front wheel supports to support a jogging wheel. The supports are mirror images of each other. One of the supports replaces the trailer tongue and extends from the same forward portion of the carrier assembly as the trailer tongue. The other of the two supports extends from an opposite lateral side. Each support is disposed in a socket (tubular receiver) and secured by a quick release pin. One of the sockets can receive the trailer tongue or one of the supports.

The carrier assembly when converted to a four wheeled stroller has installed in place of the jogging wheel assembly a pair of caster wheel assemblies. The caster wheel assemblies extend from the same forward portion of the carrier assembly as the front wheel supports. The caster wheel assemblies are each disposed in the sockets which hold the jogging wheel supports and also each secured by a quick release pin.

Other of the objects and advantages of the invention will become more apparent with reference to the appended drawings, below description of the drawings and detailed description.

BRIEF DESCRIPTION OF THE DRAWINGS

FIG. 11 is a left-sided perspective view of the carrier assembly having a trailer tongue connected thereto;

FIG. 11a is a close up of the end of the trailer tongue shown in FIG. 11 without the hitch thereon;

FIG. 12 is a left-sided perspective view of the carrier assembly converted to a three-wheeled jogging stroller;

DETAILED DESCRIPTION OF THE INVENTION

Figure 1A:
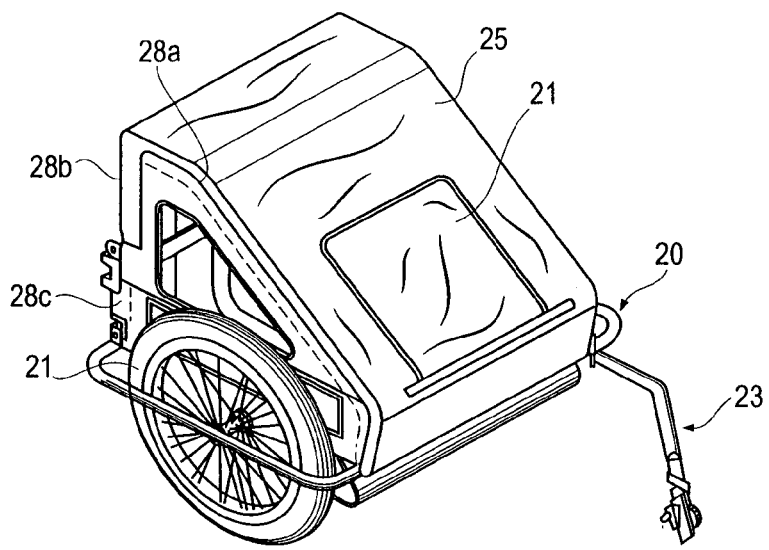
FIG. 1a depicts a front, top perspective view of a prior art trailer.
Figure 1B:
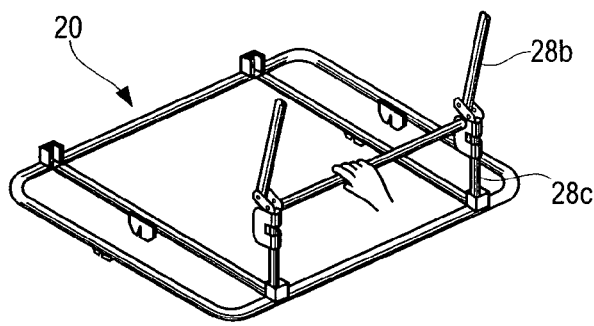
FIG. 1b depicts a rear top perspective view of the frame of the prior art trailer of FIG. 1.
Figure 2:
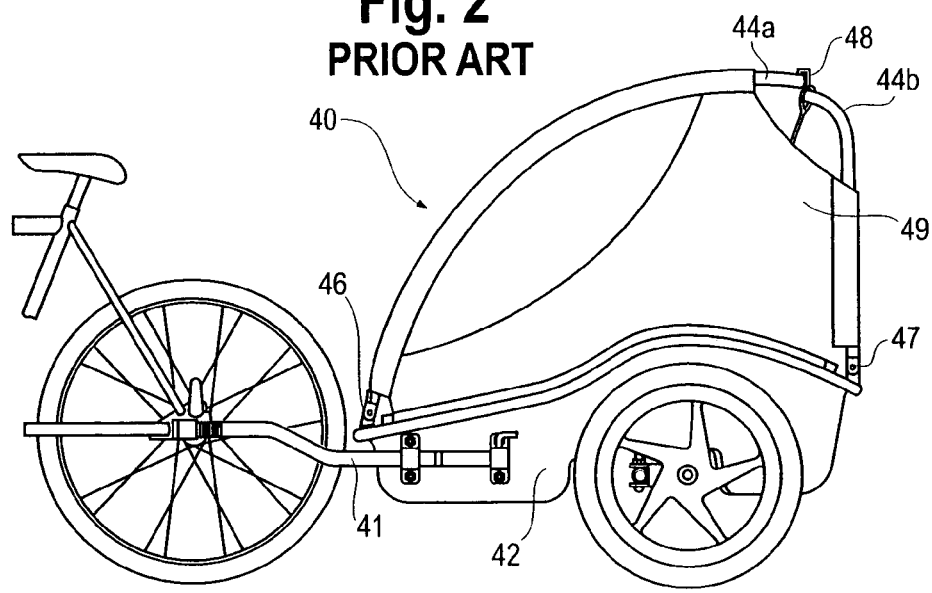
FIG. 2 depicts a side plan view of an alternative prior art trailer.
Figure 3:
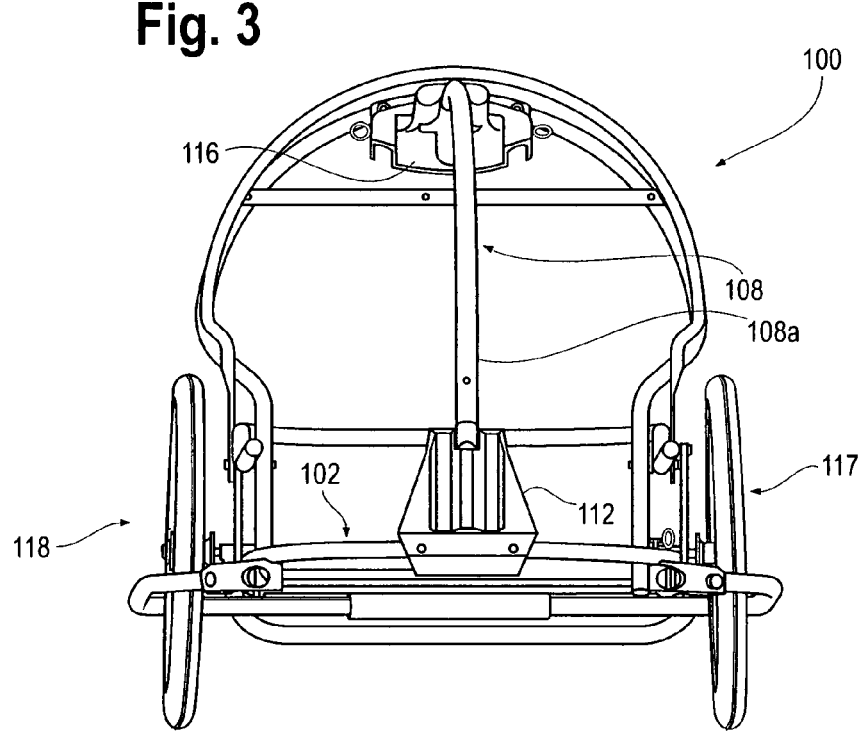
FIG. 3 is a front perspective view of an embodiment of a foldable carrier assembly which is the subject of the present invention.

Referring to FIGS. 3–10 of the drawings, an embodiment of the carrier assembly of the present invention is shown. The carrier assembly, generally depicted as 100, has a lower main frame 102a–102d. A generally inverted U-shaped or arched rear or back frame 103 is pivotally connected to aft portions of the lower frame. The back frame 103 extends from a first lateral side 102a to a second lateral side 102b of the lower main frame and extends vertically upward away from the lower main frame.

A single longitudinal arched frame member 108 extends longitudinally from a central fore area 102c of the lower main frame toward lower main frame aft area 102d, upwards towards a central area of the back frame 103. A center support 112 pivotally connects longitudinal arched frame member first end 108a to the central fore area 102c of the lower main frame. Disposed on longitudinal arched frame member second end 108b is a handle 115. The handle has a resilient latch thereon 115a. A bracket 116 having a catch 116a, in the form of an aperture, removably couples to the resilient latch, thereby removably coupling second end 108b to the central area of back frame 103.

A first wheel assembly 117 is removably coupled to the lower frame first lateral side 102a. A second wheel assembly 118 is removably coupled to the lower main frame second lateral side 102b. The wheel assemblies are each coupled via a push button release mechanism 119.

A first wheel guard 121a–121c extends longitudinally along the first lateral side 102a of the lower frame member, from the lower frame member fore area to the lower frame member aft area. The first wheel assembly 117 is disposed between the lower frame first lateral side 102a and the first wheel guard side 121c.

A second wheel guard 123a–123c extends longitudinally along the lower main frame second lateral side 102b, from the lower frame fore area towards the lower frame aft area. The second wheel assembly 118 is disposed between the lower main frame second lateral side 102b and second wheel guard side 123c.

The first and second wheel guards each have a wheel guard aft portion 121a, 123a. The wheel guard aft portions are joined together by an aft wheel guard bracket 125. The aft wheel guard bracket 125 is connected to the aft area of the lower frame.

Each wheel guard 121a–121c, 123a–123c has a wheel guard front portion 121b, 123b each of which is removably coupled to an opposite front lateral portion of the carrier proximate the lower main frame.

An upper main frame 127a–127d, spaced from the lower main frame, has opposite lateral sides 127a joined by a traversing rear portion 127b. The upper frame lateral sides are proximate the carrier's lateral sides and spaced above the lower main frame lateral sides. The upper frame traversing back portion 127b proximates the carrier's rear. A U-shaped strut having opposite sides 127c, pivotally connects to each upper frame member lateral side 127a. Additionally, the U-shaped strut opposite sides 127c towards traversing base 127d, are pivotally connected to the fore portion of each lower main frame lateral side. In the shown embodiment each opposite side 127c, as it extends away from traversing base 127d forms a flattened creased leg 127c'. It is the creased leg portion 127c' that is pivotally connected to the upper frame and lower main frame.

The carrier also has a canopy support 128 pivotally connected to lateral sides of the upper main frame.

The lower main frame comprises first and second U-shaped pieces of tubular aluminum 129a–129b. Each U-shaped piece has its legs facing towards the central portion of the carrier. The legs of the second U-shaped piece 129b receive the legs of the first U-shaped piece 129a and are bolted thereto. The second U-shaped piece forms the aft of the lower main frame and is formed from hollow metal creased to form a square, as opposed to a cornerless tube. The first U-shaped piece 129a is tubular without any creases and forms the fore portion of the lower main frame. Therefore 129b can be considered square and 129a can be considered round.

To support a fabric seat assembly (not shown) a strut 129c extends between each leg of the U-shaped piece. The lower main frame second U-shaped piece has a first axle housing 137a on its first lateral side and a second axle housing 137b on its second side. The hardware that secures axle housing 137a and 137b to the lower main frame uses the same bolts that secure U-shaped pieces 129a, 129b to each other. Each axle housing receives an axle which rotatably secures each wheel assembly to the lower main body frame.

The lower main frame first U-shaped piece 129a has a first tubular receiver 135a connected to a fore portion of the lower main frame first lateral side. A second tubular receiver 135b is connected to a fore portion of the lower main frame second lateral side. Each tubular receiver 135a, 135b slidably receives one of the caster wheel assemblies or one of the jogging wheel supports. Additionally, tubular receiver 135a receives trailer tongue 400.

Each tubular receiver 135a, 135b of the lower main frame has extending transversely outward, angled towards the rear portion of the carrier, first and second wheel guard brackets 139a, 139b. The first wheel guard bracket 139a removably couples to the first wheel guard front portion 121b. The second wheel guard bracket 139b removably couples to the second wheel guard front portion 123b. A mechanism such as a quick release pin can facilitate the removable coupling.

Figure 8:
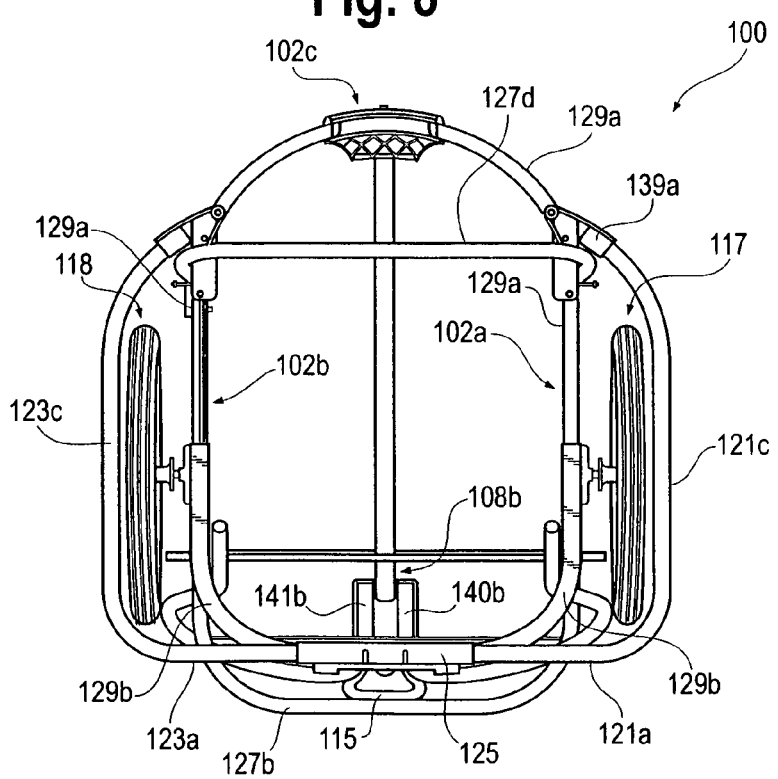
FIG. 8 is a bottom plan view of the carrier assembly of the present invention.

The back frame member 103 as described in more detail, includes a first rear frame member 140 and a second rear frame member 141. Each rear frame member 140, 141 has a rear frame member lower portion 140a, 141a and a rear frame member upper portion 140b, 141b. Each rear frame member lower portion 140a, 141a is each pivotally connected to an opposite lateral side of both the upper and lower frame members, towards the aft of the lower and upper frame members. The rear member upper portions 140b, 141b are joined together by bracket 116. The upper portions are each curved inward to extend towards the central fore area as shown in FIG. 8. The upper portions are curved inward towards the central user interface. A strut 142 connects upper portions 140b and 141b to each other. The strut 142 also is to support the fabric seat assembly.

Figure 4:
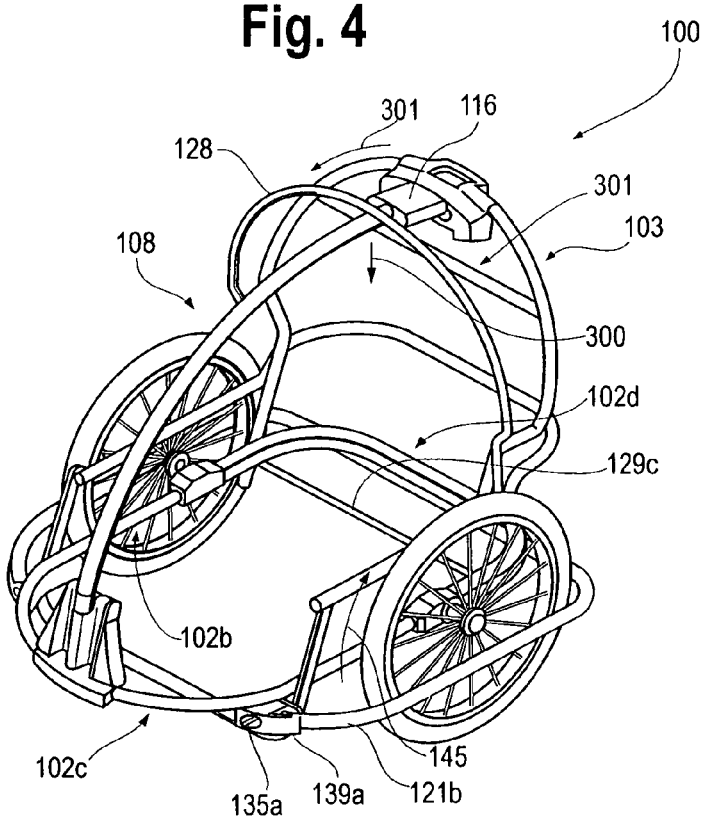
FIG. 4 is a front left sided perspective view of the carrier assembly which is the subject of the present invention.
Figure 5:
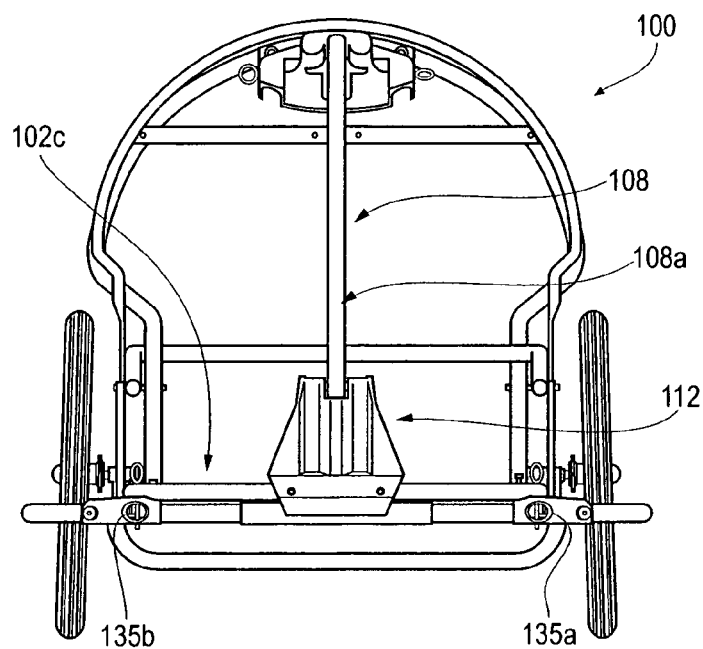
FIG. 5 is a front plan view of the carrier assembly shown in FIG. 3.
Figure 6:
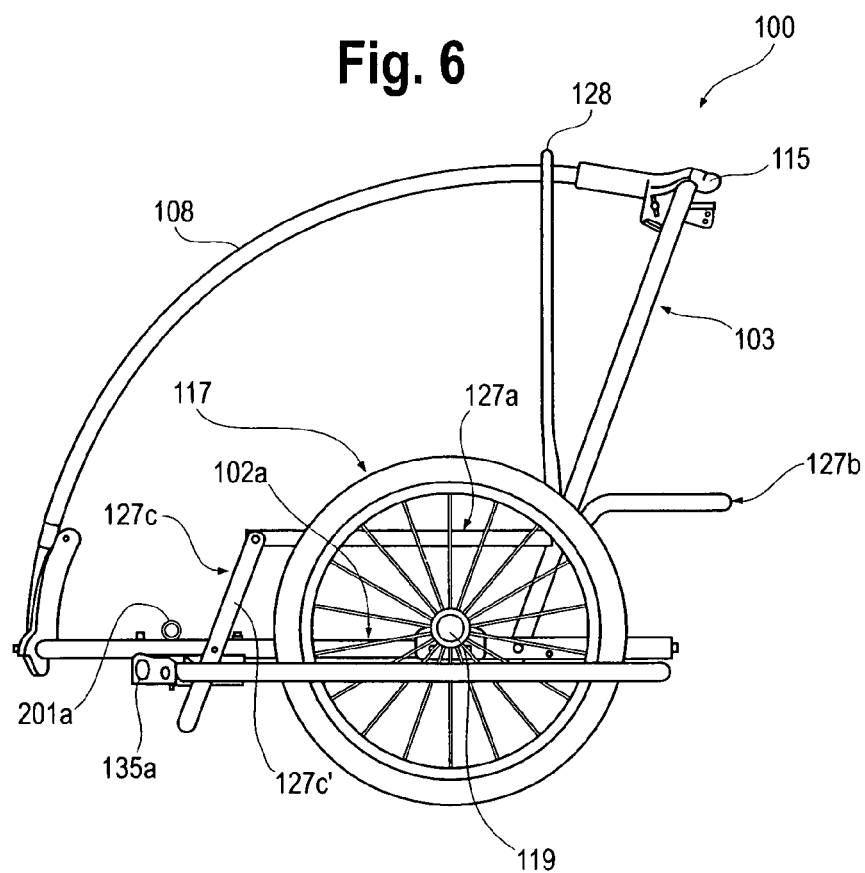
FIG. 6 is a left-sided plan view of the carrier assembly of the present invention.
Figure 7:
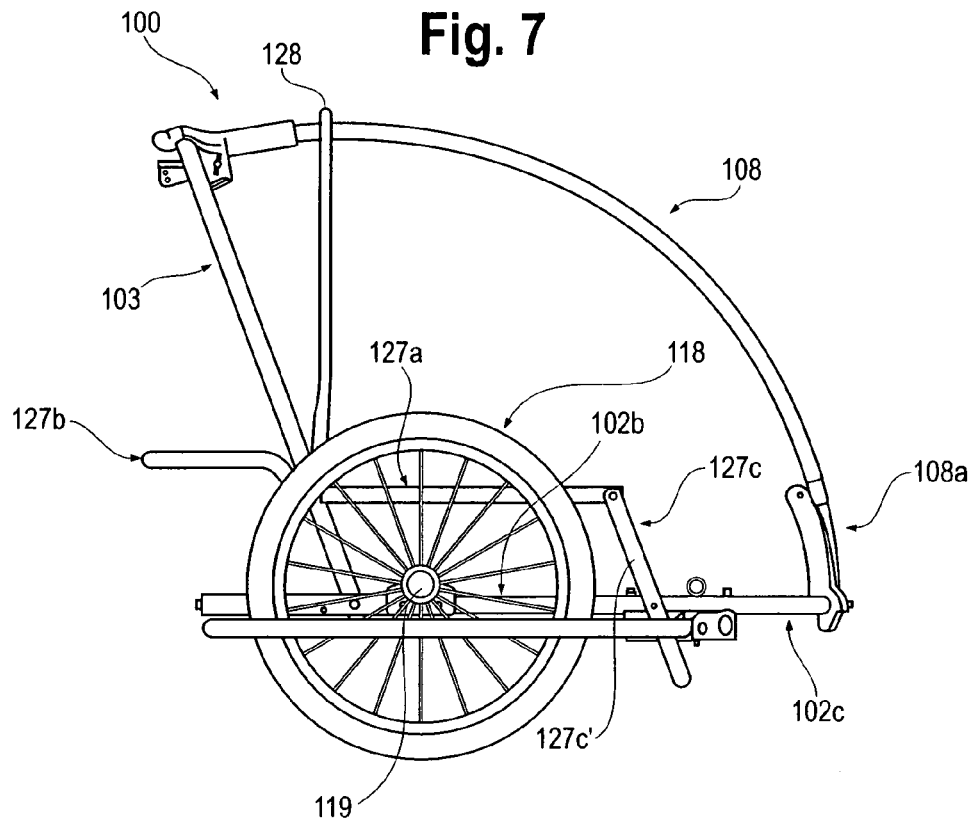
FIG. 7 is a right-sided plan view of the carrier assembly of the present invention.
Figure 9:
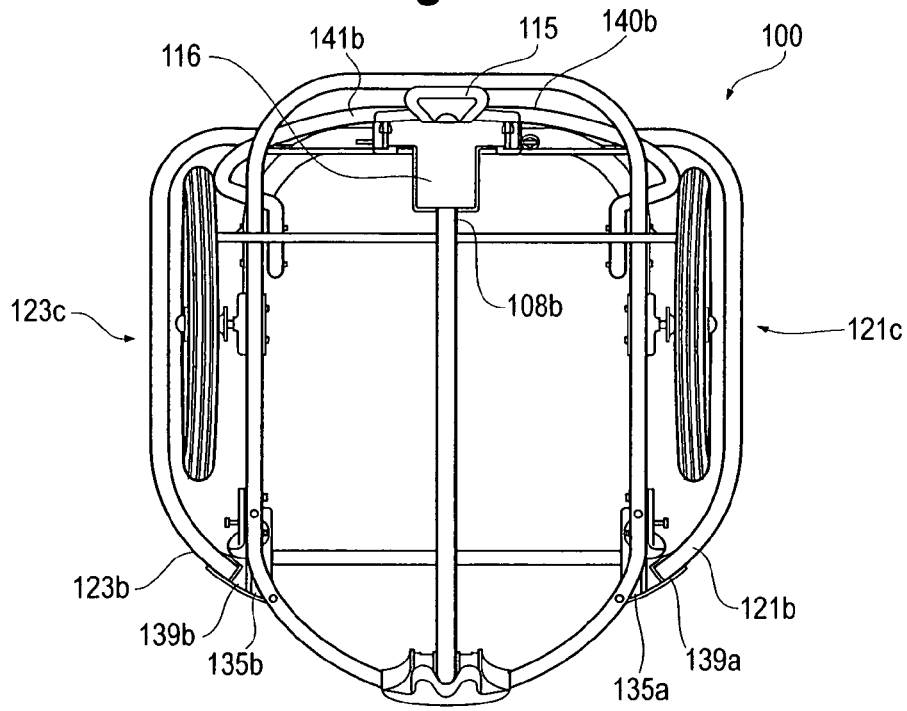
FIG. 9 is a top plan view of the carrier assembly shown in FIG. 8.
Figure 10:
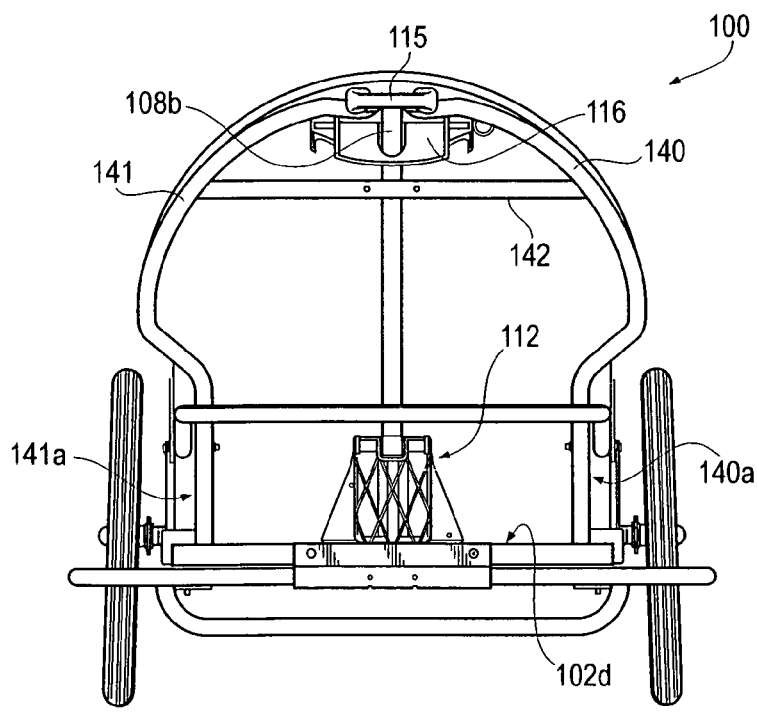
FIG. 10 is a rear plan view of the carrier assembly.
Figure 13:
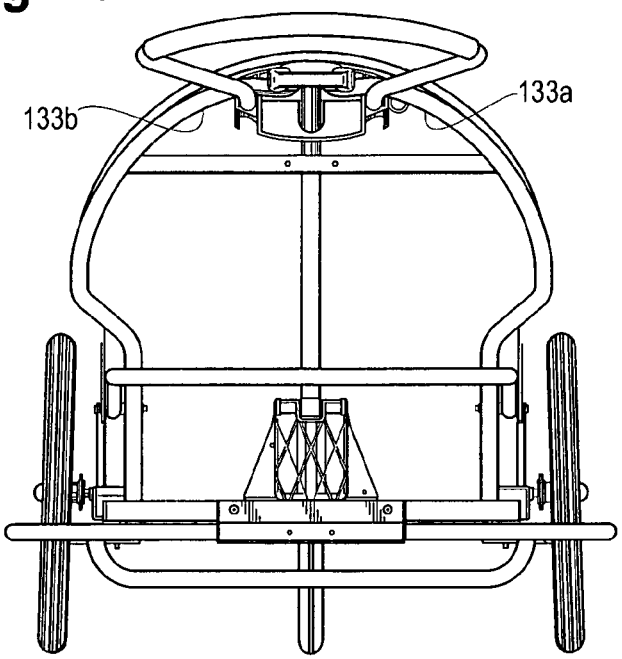
FIG. 13 is a rear plan view of the jogging stroller shown in FIG. 12.

Referring now more particularly to the first wheel guard shown in FIGS. 4, 6 and 9. The wheel guard is shown in a guard position. In the guard position, the first wheel guard front portion 121b is removably coupled to the first wheel guard bracket 139a. The first wheel guard is oriented proximate the lower main frame first lateral side and external to the first wheel assembly.

An operator, to reorient the wheel guard to a wheel release position, uncouples the wheel guard front portion 121b from the first wheel guard bracket 139a and pivots the wheel guard 121 upward away from the lower main frame fore portion towards the rear frame 103 as shown by arrow 145. A rotatable or pivoting coupling between the first wheel guard aft portion 121a and the aft wheel guard bracket 125 allows for the first wheel guard to pivot between the guarding position and the wheel release position. The second wheel guard can also be positioned from a guarding position to a wheel release position. The repositioning occurs and is facilitated as described with respect to the first wheel guard.

To convert the carrier assembly to a bicycle trailer a trailer tongue 400 or trailer connecting tube is coupled to the carrier. To couple the tongue to the carrier; a tongue first portion 400a is slidably disposed within first tubular receiver 135a and secured thereto by means of a quick release pin. The tongue has an opposite second portion 400b which receives a trailer hitch 401. The trailer hitch couples to the towing bicycle.

To convert to a jogging stroller as shown in FIG. 11, handlebar 133 is disposed within handlebar receiving apertures formed in bracket 116. The handlebar is coupled thereto by quick release pins 133a–133b. Or if already installed, the handle bar is simply folded upward as described in more detail below. The jogging wheel assembly 200a, 200b, 200c is then coupled to the carrier. A first front wheel support 200a is disposed within first tubular receiver 135a and coupled thereto by a quick release pin 201a. A second front wheel support 200b is disposed within second tubular receiver 135b and secured thereto by a quick release pin 201b. In most instances the front wheel 201c will already have been coupled to the first and second supports.

Figure 14:
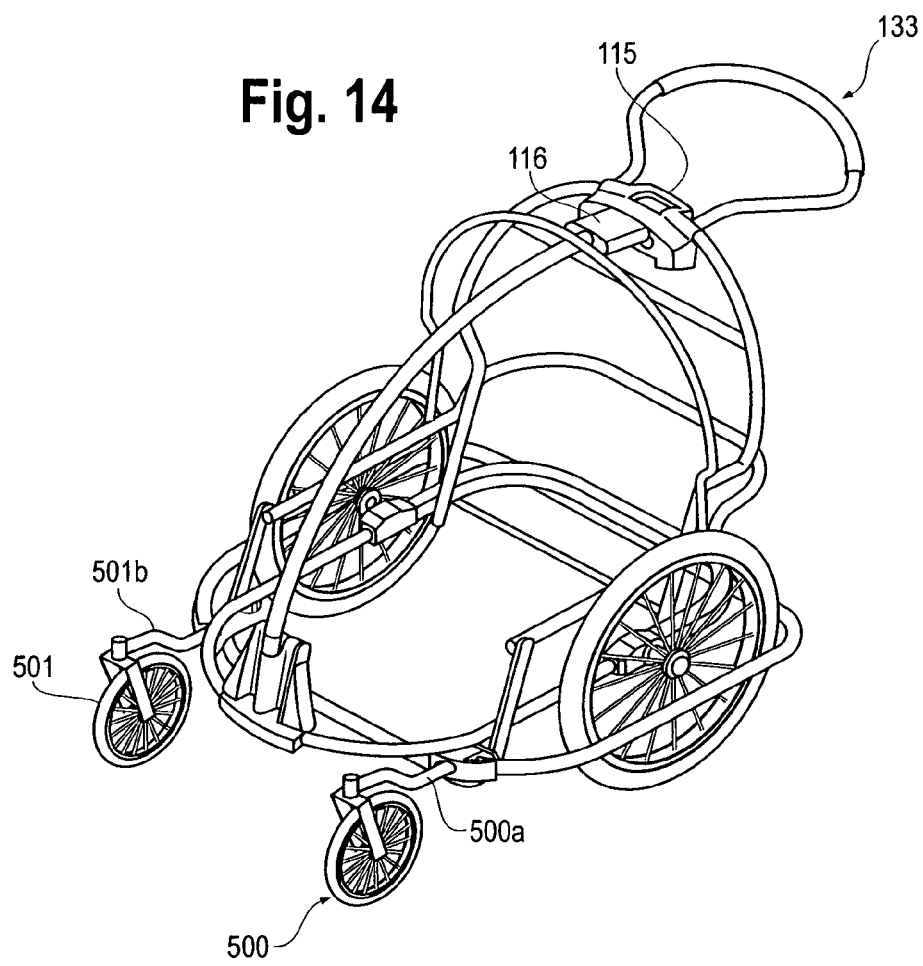
FIG. 14 is a left-sided perspective view of the carrier assembly converted to a four-wheeled caster stroller.
Figure 15:
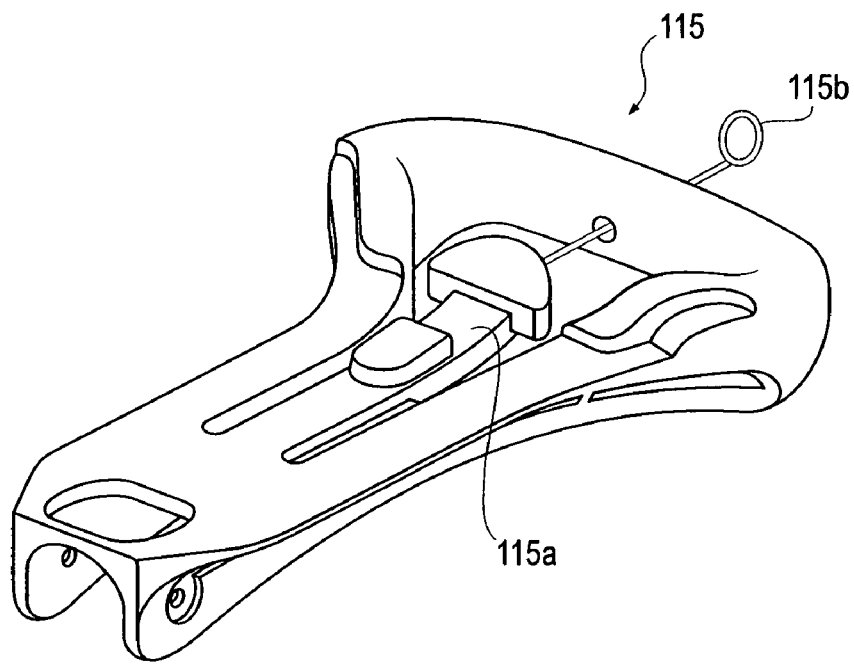
FIG. 15 is a perspective close-up of the handle shown in FIG. 6.
Figure 16:
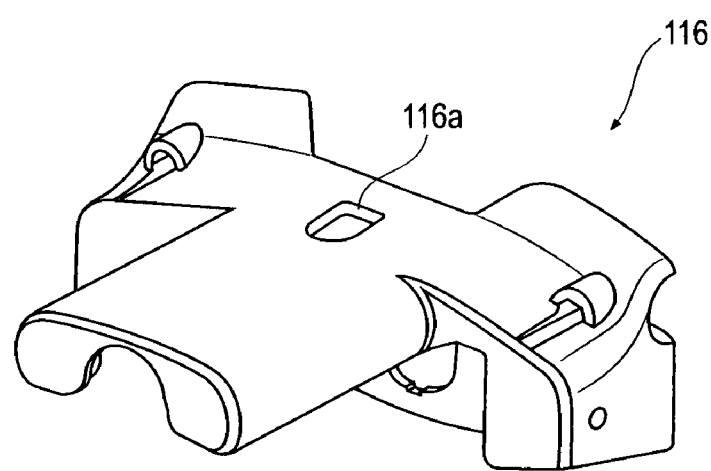
FIG. 16 is a perspective close-up of the bracket which couples with the release handle shown in FIG. 6.
Figure 17A:
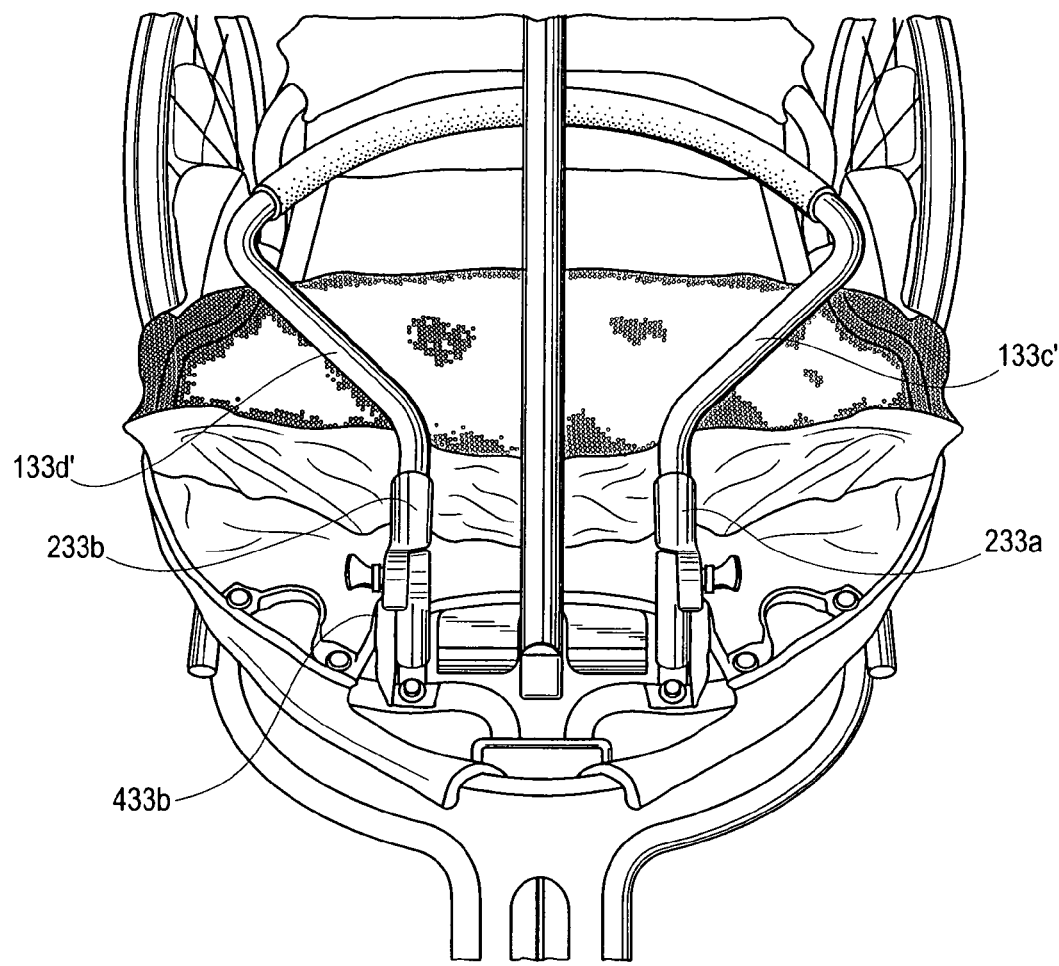
FIGS. 17a–17c show the carrier assembly converter to a jogging stroller with a handle bar attached wherein the handle bar is folded inward 180° and the frame has been folded down.
Figure 17B:
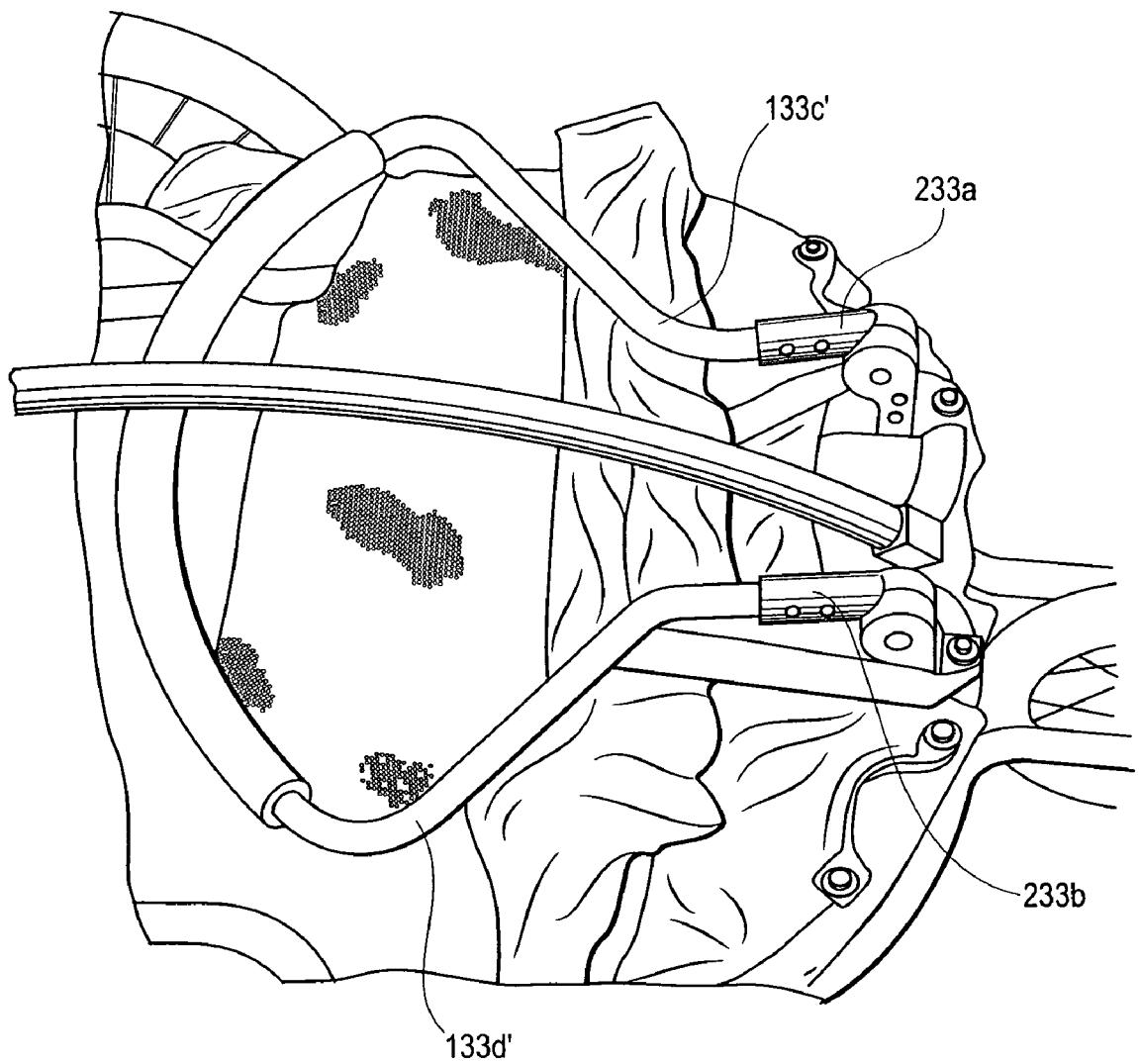
Figure 17C:
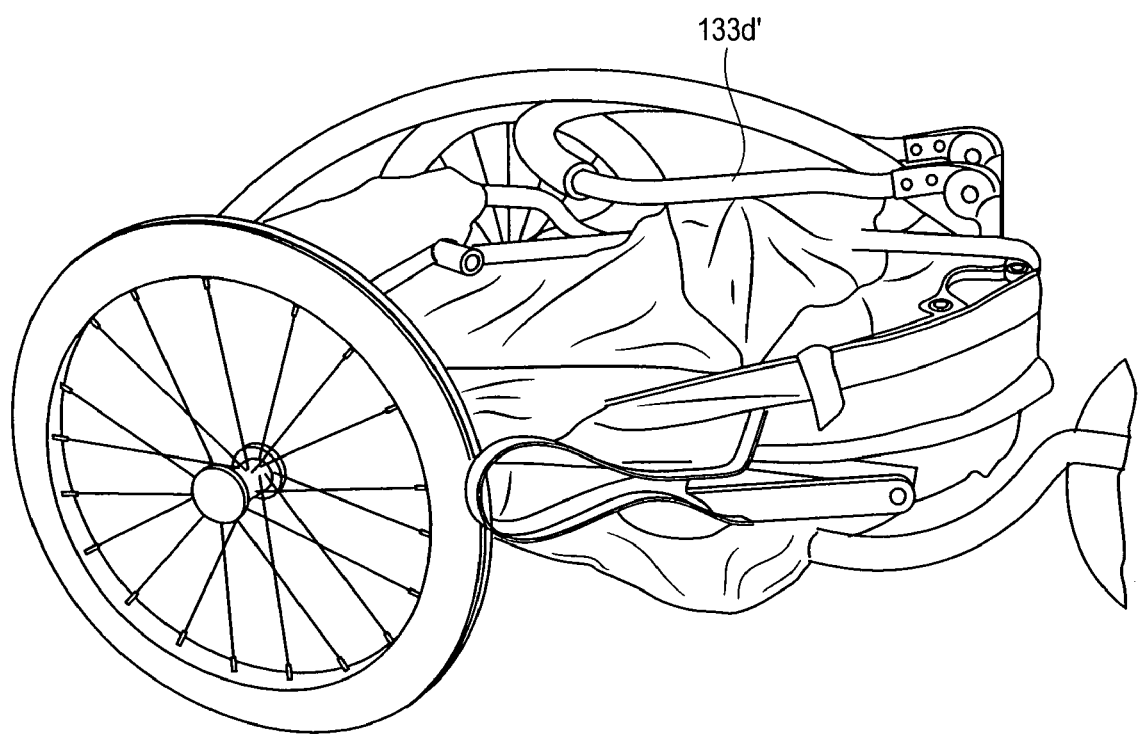

When converted to a four wheeled caster stroller as shown in FIG. 14, the jogging wheel assembly is replaced by a pair of caster assemblies 500 and 501. Each caster wheel assembly includes a support leg 500a, 500b. Each leg is disposed within a tubular receiver 135a, 135b.

Referring to FIGS. 3–7, the carrier can be orientated to a folded or storage position. To orient the carrier to the folded position, the stroller wheels, jogger wheels or trailer tongue are removed. The handlebar can also be removed, but does not have to be removed. Indeed the handle bar 133 is preferably pivotally jointed along its lateral sides 133c, 133d, 133c', 133d', so it can be folded by moving its handle portion 133a down and forward. The mechanism for folding is described in more detail below. The single longitudinal arched member 108 at its second end 108b is then unlatched from the bracket 116 on the rear frame member by actuating the resilient latch and lowering the longitudinal arched member 108 along the direction of arrow 300. To actuate the resilient latch, push tab 115a is pushed down. Prior to pushing tab 115a, a retaining pin 115b must be removed from 115a. The pin 115b is held onto 115a by a fabric tether, not shown.

Figure 18A:
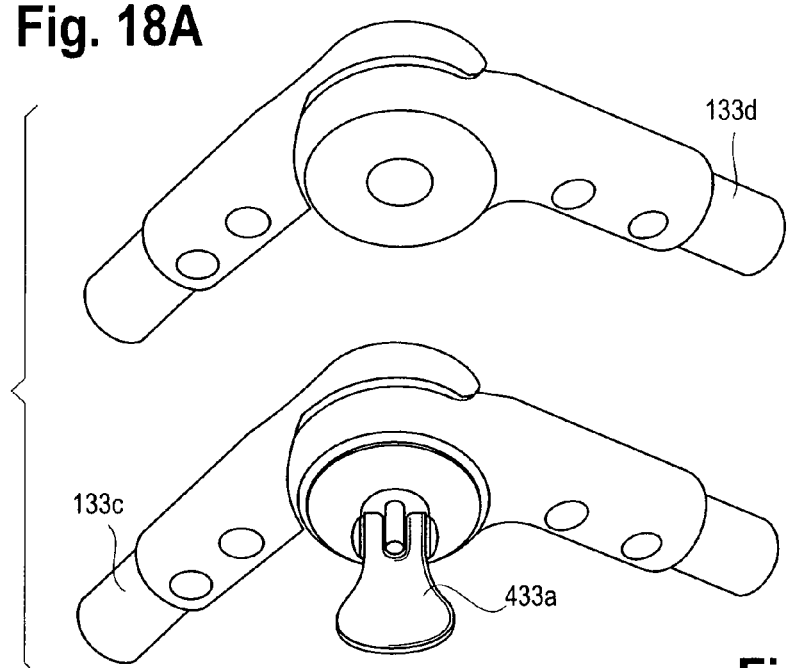
FIGS. 18a–18c disclose close-ups of a bracket for allowing the lateral sides of the handle bar to pivot along their length.
Figure 18B:
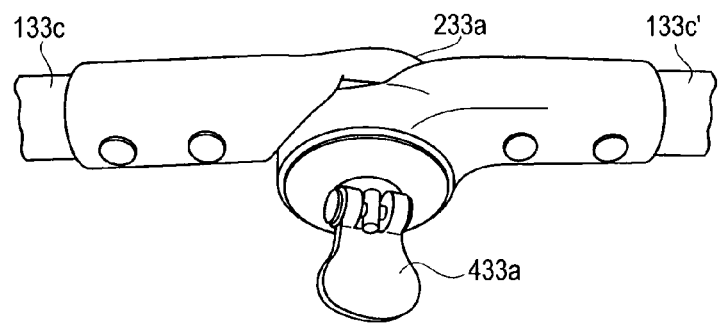
Figure 18C:
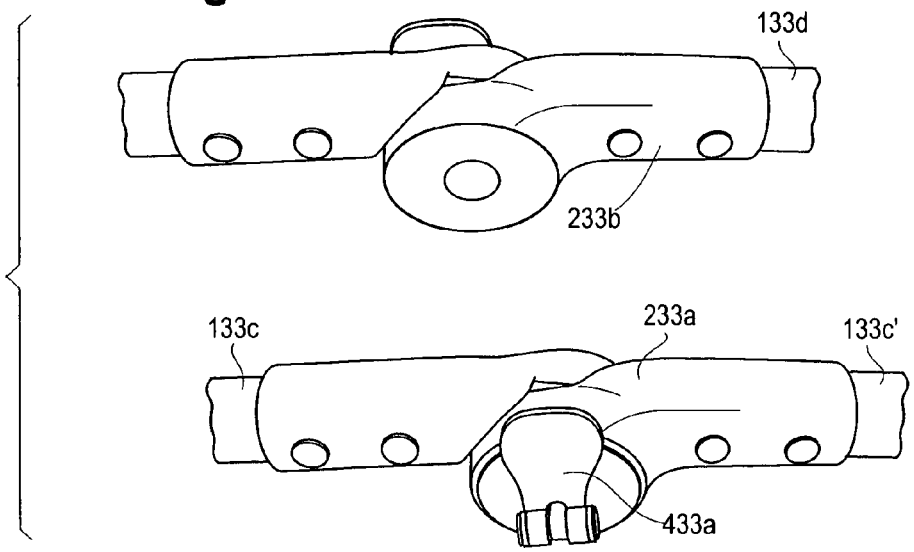
Figure 19A:
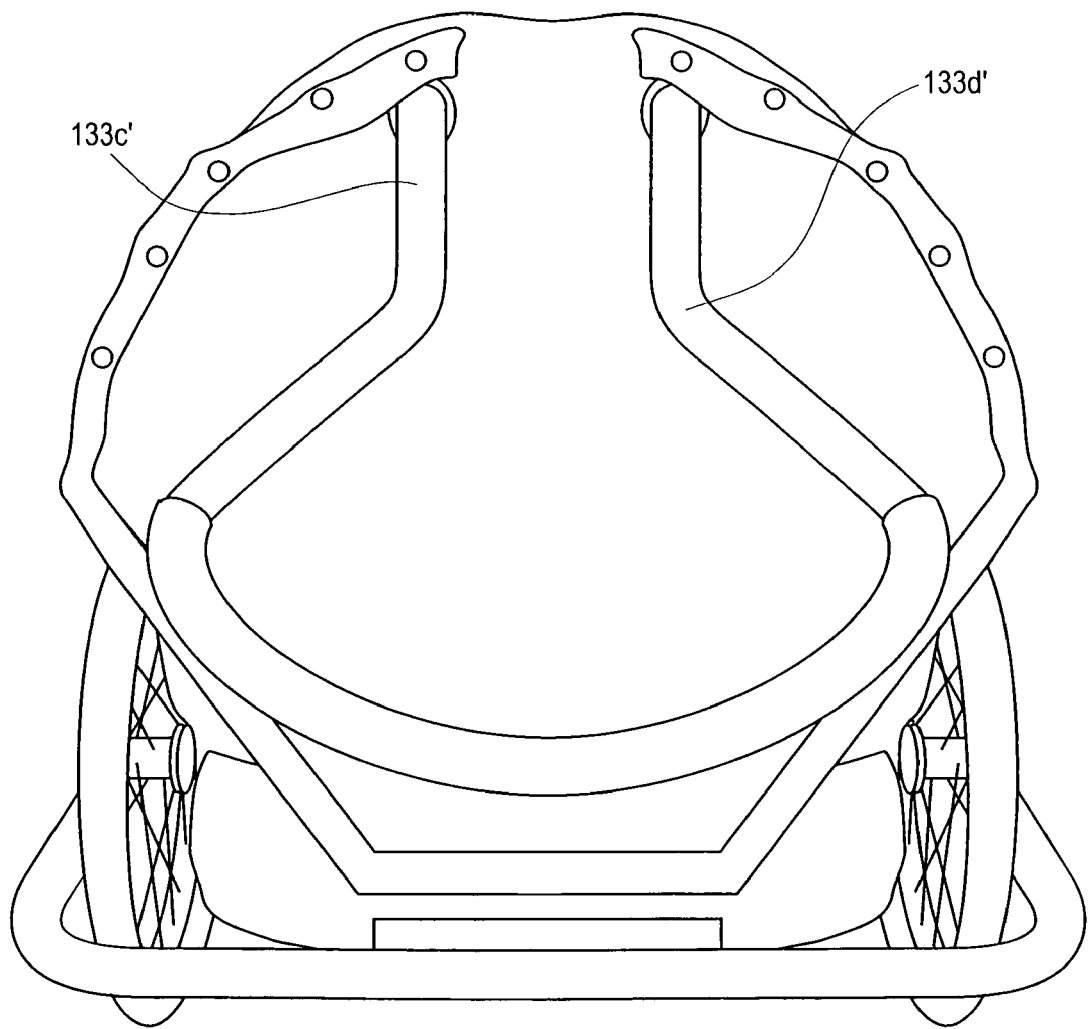
FIG. 19a–19b shows the carrier assembly converted to a jogging stroller wherein the handle bar is folded down 90°.
Figure 19B:
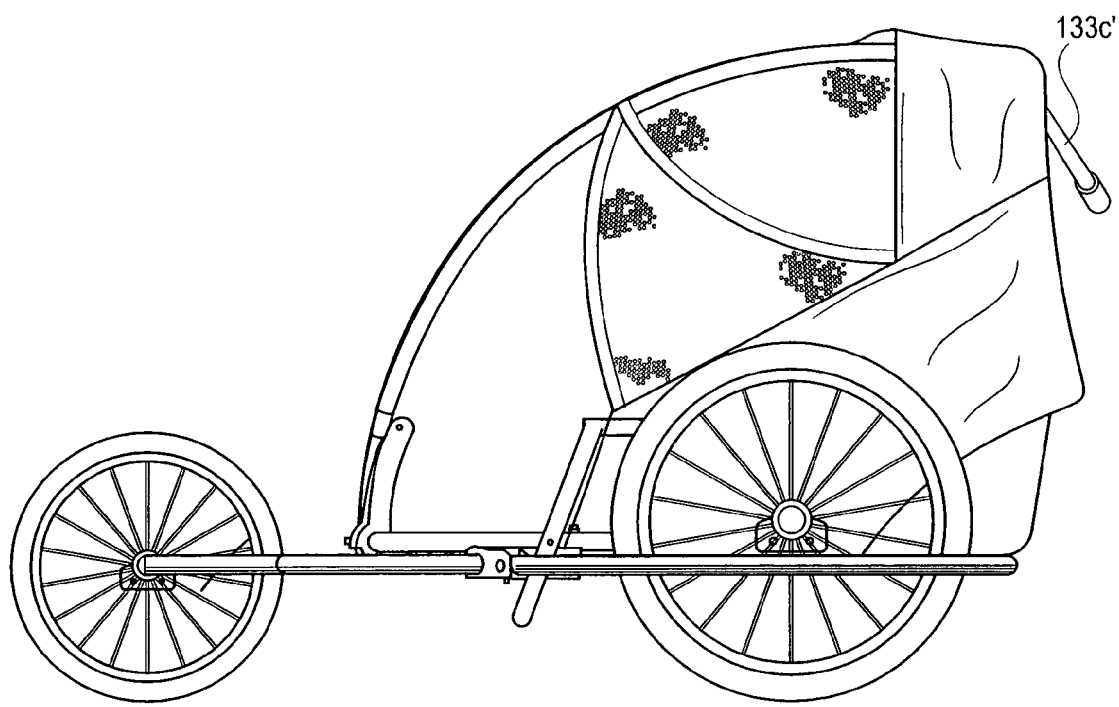

The mechanism which allows for folding of the handle 133 can best be seen in FIGS. 18a, 18b, 18c. The mechanism includes a pair of jointed brackets 233b, 233c disposed on each handle bar lateral side 133c, 133c', 133d, 133d'. Each jointed bracket pivots along its length. Each bracket thus breaks each handle bar lateral side into an aft 133c', 133d' and fore 133c, 133d portion. The handle bar aft portion 133c', 133d' is the portion which pivots down and forward when the handle bar 133 is connected to the carrier. The handle bar fore portion 133c, 133d is the portion secured to the carrier via quick release pins 133a, 133b. The fore portion remains fixed relative to the back frame member during folding. To position the handle bar up or down, a pair of quick release levers 433a, 433b, one in each bracket, each immobilizing its bracket's respective joint, are each activated. Activation allows each aft handle bar portion to pivot relative to the fore handle bar portion. The handle bar is then moved up or down. FIG. 19 shows the handle bar connected to the assembly and folded down to 90°.

The back frame member 103 should also be pushed forward and lowered towards the lower main frame member fore portion, along the direction of arrow 301. The curved member 108 remains slidably disposed within bracket 116 such that as the rear member 103 moves in forward direction 301, the curved member lowers in direction 300 towards the lower main frame while sliding through the bracket 116. Also if not removed the handle bar is pivoted downward towards the lower main frame along its jointed sides 133c, 133c', 133d, 133d'. The lowering of the rear frame member causes a concurrent folding of the upper frame member 127a–127d such that the trailer can be finally folded.

Figure 20:
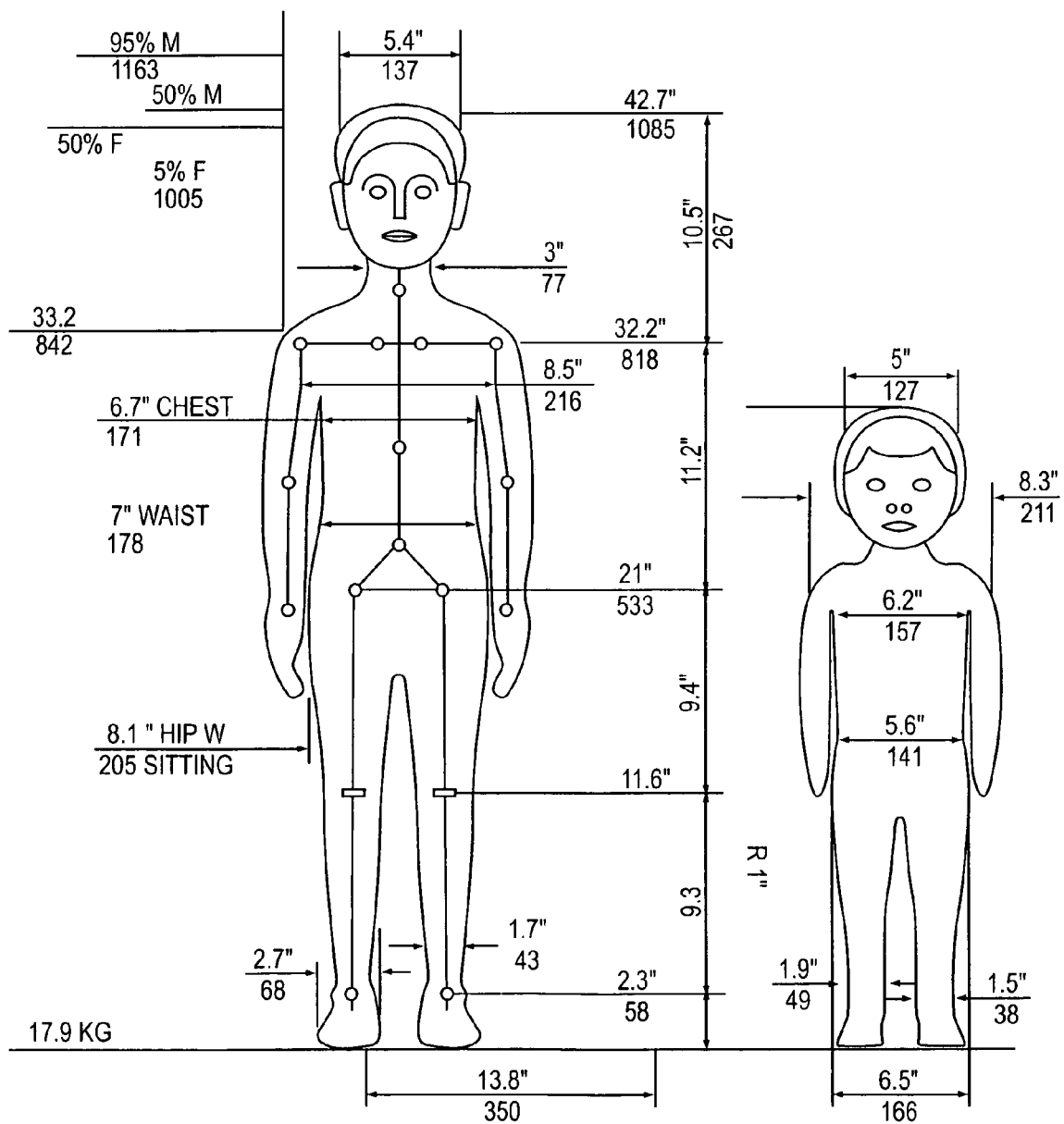
FIG. 20 graphically depicts the proportions of two children which are capable of being seated in the carrier assembly of the present invention.

It should be noted a sufficient transverse distance could exist between the first and second lateral main frame sides to accommodate two 5 year old children having physical proportions which place them in the $50^{th}$ percentile. A non-limiting example of the types of children which the trailer can accommodate are shown in FIG. 20.

Although examples of embodiments of the invention have been disclosed, it should be appreciated that further modifications and variations may be made thereto without departing from the scope of the invention.

The invention claimed is:

1. A carrier assembly convertible between a bicycle trailer and a stroller comprising:
    a lower main frame, said lower main frame having a first and second lateral side;
    an upper main frame, said upper main frame pivotally coupled to each lower main frame first and second lateral sides;
    a rear frame member, said rear frame member having first and second lateral sides, said first lateral side rear frame member pivotally coupled to said lower main frame and said upper main frame, said second rear frame member lateral side pivotally coupled to said lower main frame and said upper main frame member;
    a central frame member extending longitudinally proximate a fore area of said lower main frame, upwards and towards said rear frame member, proximate a central area of said rear frame member, said central frame member pivotally coupled to said lower frame;
    a first axial housing on said lower main frame first lateral side, a second axial housing on said tower main frame second lateral side;

a first wheel guard proximate said lower main frame member first lateral side, a second wheel guard proximate said lower main frame second lateral side, said first and second wheel guard each having a first portion pivotally connected to portions of said carrier assembly, each wheel guard having a second portion removably couplable to other portions of said carrier assembly;

a first support coupled to a first fore portion of said lower main frame, a second support coupled to a second fore portion of said lower main frame; and an optional configuration which can be any configuration selected from a group of configurations consisting of:
1) a trailer tongue coupled to said first support,
2) a jogging wheel assembly coupled to said first and second supports, and
3) first castor wheel assembly coupled to said first support and a second castor wheel assembly connected to said second support.

2. The carrier assembly of claim 1 wherein said upper main frame comprises:

a U-shaped strut having opposite first and second sides extending upwards from a traversing base portion, said first opposite side pivotally coupled to said fore area, said second opposite side pivotally coupled to said fore area, said first opposite side coupled to a first lateral portion of said upper main frame, said second opposite side pivotally connected to a second lateral side of said upper main frame.

3. The carrier assembly of claim 1 wherein said lower frame comprises first and second U-shaped pieces coupled together and oppositely oriented.

4. The carrier assembly of claim 1 wherein said rear frame member comprises a first rear frame member and a second rear frame member, each first and second rear frame member has upper portions, said upper portions are joined together by a bracket.

5. The carrier assembly of claim 1 further comprising a bracket mounted on an aft portion of said lower main frame; and wherein
an aft portion of said first wheel guard is pivotally coupled to said bracket, and
an aft portion of said second wheel guard is pivotally coupled to said bracket.

6. The carrier assembly of claim 1 further comprising a handle bar coupled to the carrier assembly proximate a central portion of said rear frame member.

7. The carrier assembly of claim 1 further comprising:
a first wheel assembly coupled to the first axial housing; and
a second wheel assembly coupled to the second axial housing.

8. The carrier assembly of claim 6 wherein the handle bar has a first jointed lateral side and a second jointed lateral side.

* * * * *